United States Patent [19]

Kohno et al.

[11] Patent Number: 4,557,574
[45] Date of Patent: Dec. 10, 1985

[54] CAMERA WITH PROTECTIVE COVER

[75] Inventors: Atsuo Kohno; Minoru Shiiba, both of Tokyo, Japan

[73] Assignee: Fuji Photo Film Co., Ltd., Kanagawa, Japan

[21] Appl. No.: 656,411

[22] Filed: Oct. 1, 1984

[30] Foreign Application Priority Data

Oct. 3, 1983 [JP] Japan ............................... 58-152036
Oct. 3, 1983 [JP] Japan ............................... 58-152037

[51] Int. Cl.⁴ ............................................ G03B 17/04
[52] U.S. Cl. ............................... 354/288; 354/149.11; 354/187
[58] Field of Search ............. 354/82, 149.11, 187, 354/219, 288

[56] References Cited

U.S. PATENT DOCUMENTS 4,032,940 6/1977 Chan ..................................... 354/187
4,106,037 8/1978 Nakamura et al. .................... 354/288
4,299,465 11/1981 Chan ............................... 354/149.11
4,363,546 12/1982 Enomoto et al. ...................... 354/187

FOREIGN PATENT DOCUMENTS 2803034 8/1978 Fed. Rep. of Germany ...... 354/288
2902600 7/1980 Fed. Rep. of Germany ...... 354/187
2100870 1/1983 United Kingdom ............... 354/288

Primary Examiner—A. A. Mathews
Attorney, Agent, or Firm—Young & Thompson

[57] ABSTRACT

A protective cover with an opening is of a box shape, and is slidably mounted on the front face of a camera body. When the protective cover is slid to an open position, the end face of the protective cover retreats from over the taking lens to expose it, and the opening then coincides with a flash unit and a viewfinder vertically disposed relative to the flash unit to thereby expose the flash unit and the viewfinder. When the protective cover is opened, a power switch is turned on by being contacted by a portion of the protective cover, and a projecting plate disposed sideways of the flash unit unit projects out of a slot formed in the protective cover. The protective cover is formed with a tunnel portion for passing a strap therethrough, and the strap is connected, not to the cover, but rather to the camera body, so that tension on the strap has no tendency to open the cover. Electric components such as an electric cell and the like are accommodated within the protective cover in a space below the tunnel portion.

14 Claims, 10 Drawing Figures

CAMERA WITH PROTECTIVE COVER

BACKGROUND OF THE INVENTION

The present invention relates to a camera with a protective cover for sheltering a taking lens and a flash unit when the camera is not used.

In order to dispense with an outer casing for the modern compact cameras, there has been a tendency to provide a protective cover or lens cover which is slidable with respect to the camera body. One of these protective covers is of the plate type, and another is of the box type and constitutes a part of the camera body. The protective cover of the box type is mainly used for a camera of 110 size. As the protective cover of the box type is pulled out from the camera body, the taking lens and a finder are exposed. While photographing, the protective cover is utilized as a grip for the camera. The utilization of the protective cover of the box type as a grip, however, has been found not to be satisfactory in that it is difficult to hold the camera tightly due to the unbalance of the right and left portions of the camera body.

Other compact cameras have an electronic flash device built into the camera body. One such camera with a built-in electronic flash device is of the type in which the flash emitting unit is exposed at the front face of the camera body and is fixed to the camera body, while another is of the type in which the flash unit accommodated within the camera body pops up therefrom for flash photography. The former type of camera does not need a pop-up mechanism for the flash unit, so that it is possible to make the camera small in size. However, since the electronic flash device is always exposed, there are problems in that the flash unit may become scratched, broken, or dirty. Furthermore, since the flash unit and the finder are disposed separately along the length of the camera body on the front face thereof, this lateral dimension of the camera body becomes undesirably great. In addition, it happens frequently that a finger or fingers inadvertently mask a part of the flash unit while holding with hands the body of a camera with an electronic flash device. With the fingers masking a part of the flash unit, the flash for illuminating an object to be photographed becomes insufficient, and the resultant photograph is underexposed.

OBJECTS OF THE INVENTION

It is a principal object of the present invention to provide a camera with a protective cover in which a flash unit is sheltered by the cover while using the camera thereby to avoid scratching or the like.

It is another object of the present invention to provide a camera with a protective cover in which miniaturization can be attained by disposing a flash unit and a finder in vertical alignment to each other.

It is a further object of the present invention to provide a camera with a protective cover which is proof against forgetting to open or shut the flash unit, because both the flash unit and the finder are opened or shut together.

It is a still further object of the present invention to provide a camera with a protective cover which can preserve the balance between the right and left portions of the whole camera while pulling open the protective cover.

It is an additional object of the present invention to provide a camera with a protective cover which indicates during flash photography whether fingers are masking the flash unit.

It is still an additional object of the present invention to provide a camera with a protective cover in which a power switch is turned on or off by the opening or closing of the protective cover.

Finally, it is an object of the present invention to provide a camera with a protective cover which prevents the cover from being opened by tension on the strap by which the camera is carried.

SUMMARY OF THE INVENTION

In order to achieve the above and other objects and advantages, the present invention provides that a protective cover having in the front face thereof an opening be mounted slidably with respect to the camera body. When the protective cover is in a closed position, the taking lens and flash unit are sheltered; and when the protective cover is in an open position, the taking lens is exposed and the opening coincides with the flash unit to expose it.

According to a preferred embodiment of the present invention, the flash unit and finder are mounted on the front face of the camera body in vertical alignment with each other, and are opened or closed at the same time by the opening of the protective cover. The protective cover is of the box type, and it accommodates electrical components such as an electric cell and the like thereby to maintain the balance of the right and left portions of the camera. When the protective cover is open, a projecting plate which is disposed beside the flash unit for preventing a finger from masking the flash unit, projects out of a slot formed in the protective cover, and a power switch turns on. As the protective cover is returned to a closed position, the projecting plate retracts inside the protective cover, and the power switch turns off. A strap is coupled to the camera body through a tunnel portion formed on the protective cover.

DETAILED DESCRIPTION OF THE INVENTION

Figure 1:
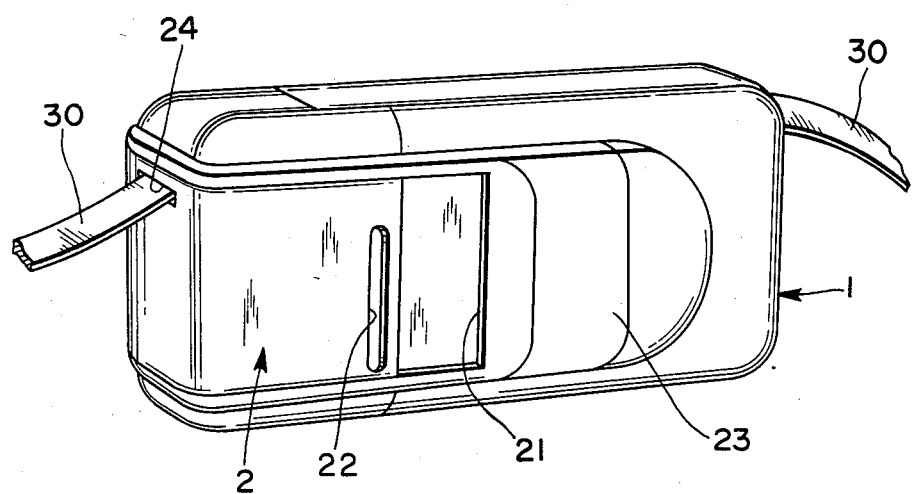
FIG. 1 is a perspective view showing an embodiment of the present invention in which the protective cover is closed.

Referring now to FIG. 1 in which the protective cover is shown closed, at the right side of the camera body 1, the protective cover 2 is slidably mounted on the camera body 1. The protective cover 2 is of box shape and constitutes a part of the camera body 1. The protective cover 2 is provided on the front face thereof with an opening 21, a slot 22, and an expanded portion 23.

One end of a strap 30 is coupled to a side portion of the camera body 1 with a metal part or the like, and the other end is fixed to the other side of the camera body 1 through a tunnel portion 24 of the camera body 1. Thus, while carrying the camera, the protective cover 2 is prevented from opening. That is, if one end of the strap 30 were instead coupled to a side portion of the protective cover 2, tension in the strap 30 while carrying the camera would act upon the protective cover 2 so that the protective cover 2 would open. But thanks to the arrangement of the present invention, this does not happen. The tunnel portion 24 guides the strap 30 so as to give it slack within the protective cover 20, so that the opening and closing operations of the protective cover 2 will not be interrupted.

Figure 2:
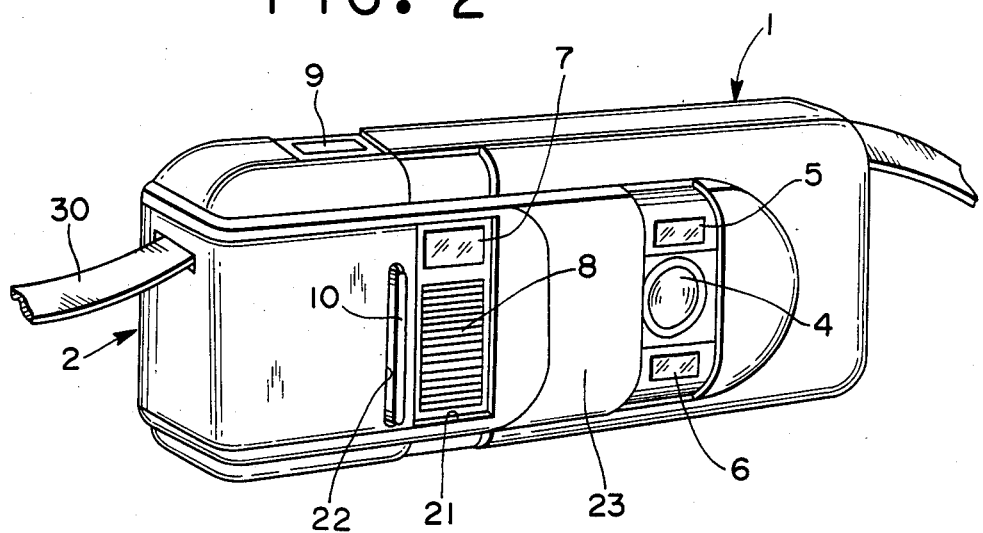
FIG. 2 is a perspective view in which the protective cover is open.

FIG. 2 is a view in which the protective cover is shown open. The camera body 1 is provided with a taking lens 4 at its front face, and rangefinder windows 5 and 6 are disposed respectively above and below the taking lens 4. The taking lens 4 and rangefinder windows 5 and 6 are sheltered by expanded portion 23 of the protective cover 2 when the camera is not in use, and are exposed when the protective cover 2 is pulled open.

At the right side of the front face of the camera body 1, a viewfinder 7 and a flash unit 8 are disposed in vertical alignment with each other. The opening 21 of the protective cover 2 coincides with the viewfinder 7 and the flash unit 8 to expose them when the protective cover 2 is moved to open position. It is to be seen from the above, that since the viewfinder 7 and the flash unit 8 are disposed one above the other on the front face of the camera body 1, the lateral length of the camera body 1 is shortened advantageously to make it compact.

At the right side on top of the camera body 1, a shutter release member 9 is provided which is exposed when the protective cover 2 is opened.

A projecting plate 10 for preventing a finger from masking the taking lens 4 is disposed at the right of the flash unit 8. The projecting plate 10 projects out of the camera body 1 through a slot 22 in the protective cover 2 when the protective cover 2 is open. The projecting plate 10 borders the flash unit 8, and gives a tactile indication that the flash unit 8 is covered by the fingers so that the object to be photographed will not be normally illuminated. Therefore, without looking at the flash unit 8 every time the camera body is held, a tactile indication will be given as to whether the camera body 1 is correctly held or not.

Figure 3:
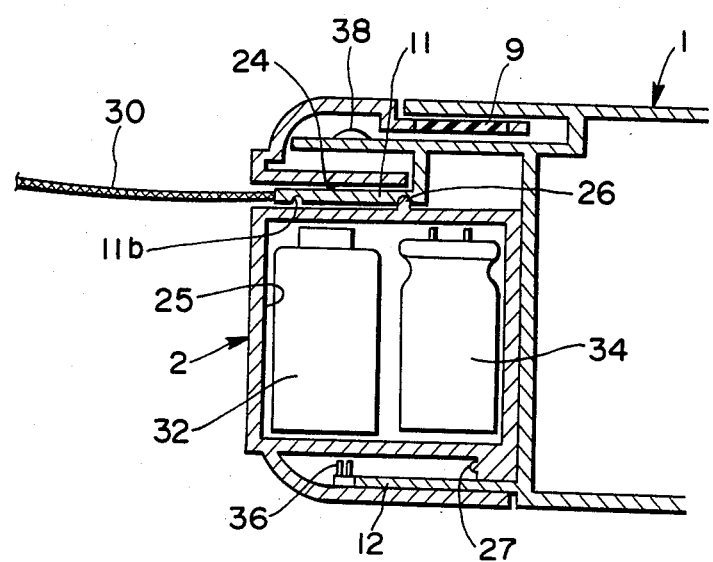
FIG. 3 is a view showing the structure of the protective cover in closed position in section.
Figure 4:
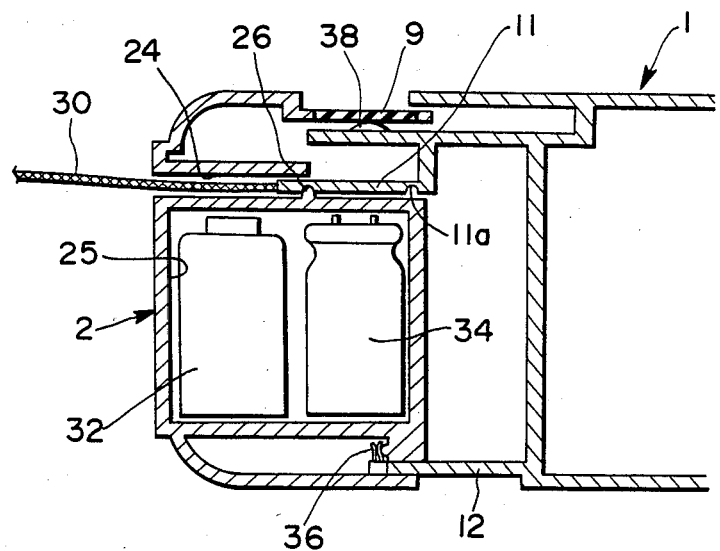
FIG. 4 is a sectional view in which the protective cover is open.

FIGS. 3 and 4 show the structure of the protective cover. The cover 2 has a hollow portion 25 in which electric components such as a lithium cell 32, a capacitor 34 for an electronic flash device and the like are accommodated. By accommodating the electric parts within the protective cover 2, it is possible to preserve the weight balance between the camera body 1 with its camera mechanisms and the protective cover 2 with the electric components, when the protective cover 2 is pulled out. Thus, the camera as a whole has a good weight balance which assits in tightly holding it while photographing.

Into a tunnel portion 24 of a rectangular tubular shape, an arm section 11 of the camera body 1 and a portion of a strap 30 fixed to the tip of the arm section 11 are inserted. The arm section 11 is provided with two position-setting click grooves 11a and 11b. A click protuberance 26 formed on the camera body 1 engages with either one of the position-setting click grooves 11a and 11b.

A power switch 36 for use in the electronic flash device and the like is mounted on a base plate 12 of the camera body 1. The power switch 36 is closed, that is, turned on by engagement with the protuberance 27 on the protective cover 2 when the protective cover is opened. Since the power switch 36 is turned on or off by the opening or closing of the protective cover 2, it is not necessary manually to operate the power switch. Furthermore, there is no danger that the operator will inadvertently forget to turn off the power switch when the camera is no longer in use. In particular, with a camera whose electronic flash device starts charging when the power switch is turned on, a time-consuming charging may effectively be performed before the start of photographing. A fixed contact 38 for the shutter release switch is provided on the camera body 1 below the shutter release member 9.

Figure 5:
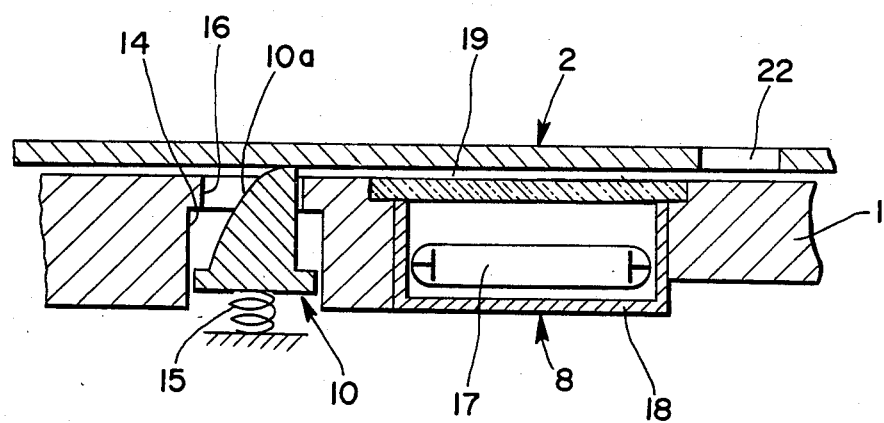
FIG. 5 is a sectional view showing an embodiment of a projection mechanism for the projection plate, in which the projection plate is shown in retracted position.
Figure 6:
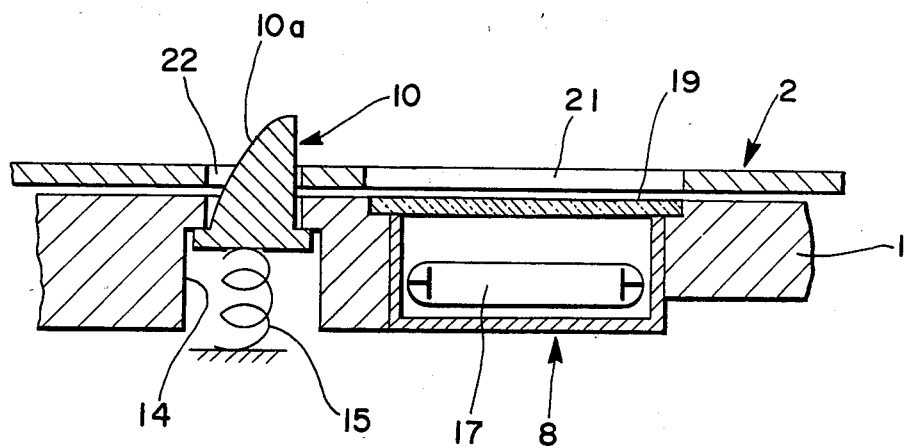
FIG. 6 is a sectional view showing the projection plate in projected position.

FIGS. 5 and 6 show an embodiment of projection mechanism for the projecting plate. The projecting plate 10 is housed within a recess 14, and is urged by a spring 15 in a direction to project out of a hole 16. The projecting plate 10 has a tapered arcuate surface 10a on one side thereof so that the projecting plate 10 is pushed down by an edge of the slot 22 when the protective cover 2 is closed.

The flash unit 8 is comprised by a flash discharge tube 17, a reflector 18 which accommodates the flash discharge tube 17, and a light-diffusing plate 19 positioned in front of the reflector 18, as is well known in the art.

When the protective cover 2 is closed, the projecting plate 10 is pushed inside the protective cover 2 (FIG. 5). When the protective cover 2 is opened, the slot 22 moves in front of the projecting plate 10, which projects out through the slot 22 under the influence of spring 15. When the protective cover 2 is closed, since the edge of the slot 22 cams the tapered surface 10a, the projecting plate 10 is pushed against the spring 15 and retracts as shown in FIG. 5. In the above embodiment, the projecting plate 10 retracts directly by engagement with the protective cover 2. However, it is also possible to provide between the protective cover 2 and the projecting plate 10 a lever mechanism which moves the projecting plate 10.

Figure 7:
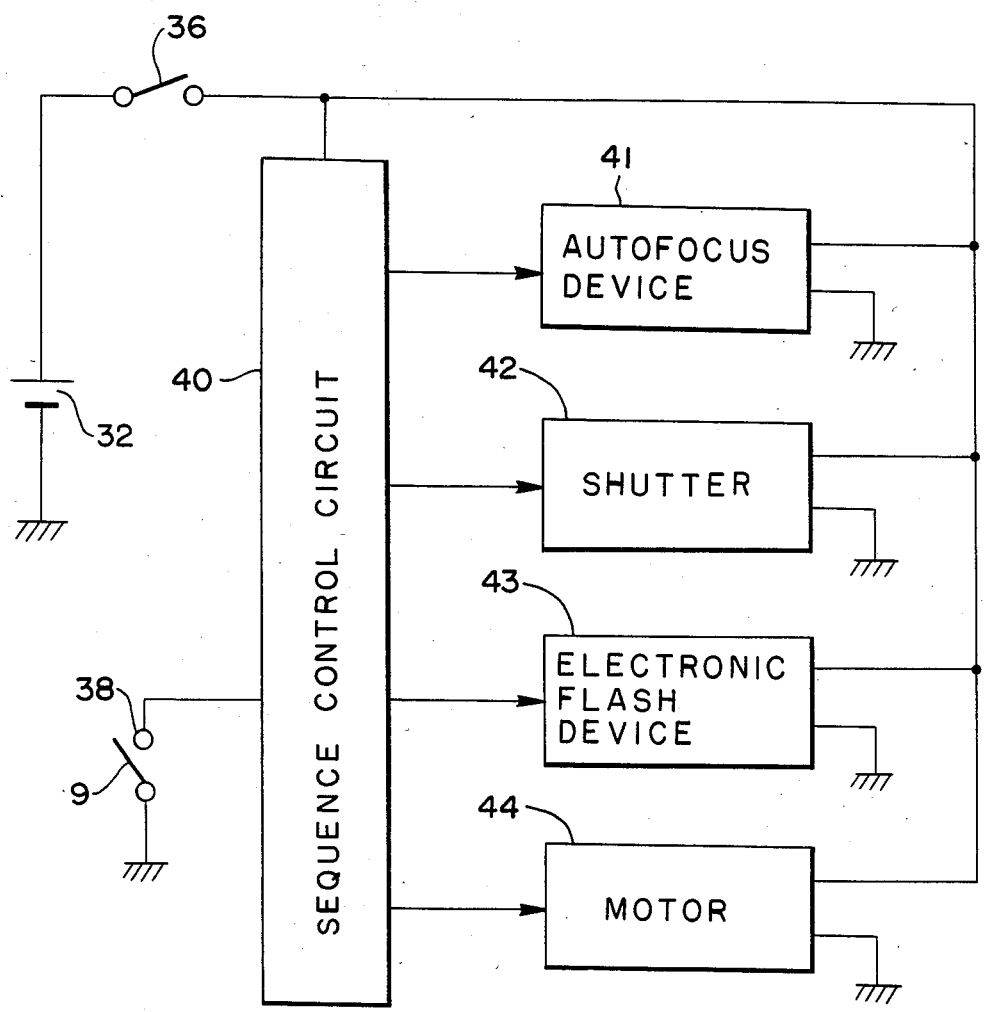
FIG. 7 is a block diagram showing an electronic circuit for the camera.

FIG. 7 is a block diagram showing the electric circuit of the camera. When the power switch 36 is turned on, power is supplied to a sequence control circuit 40, an autofocussing device 41, a shutter 42, and the electronic flash device 43. When the release member 9 contact the fixed contact 38, then the autofocussing device 41 is actuated to adjust the focus of the taking lens 4. Next, the shutter 42 is actuated to begin the exposure, and in synchronization with this the electronic flash device 43 flashes. Upon completion of the photograph, a motor 44 rotates to advance the film by one frame and to cock the shutter 42. Thereafter, the electronic flash device 43 starts charging. The electronic flash device 43 is here provided with an automatic cutoff function by which the charging is automatically stopped when a predetermined charge voltage is obtained.

Next, the operation of the above embodiments will be described. When the camera is not in use, as shown in FIG. 1, the protective cover 2 is closed and the click protuberance 26 engages in the click groove 11a. When the protective cover 2 is closed, the taking lens 4, the distance detector windows 5 and 6, the viewfinder 7, the flash unit 8 and the release member 9 are all covered.

When the camera is used, the protective cover 2 is pulled out to the right and assumes its open position wherein the click protuberance 26 engages in the click groove 11b. When the protective cover 2 is open, the expanded portion 23 of the protective cover 2 no longer overlies but rather exposes the taking lens 4 and the distance detector windows 5 and 6. The opening 21 of the protective cover 2 now coincides with the viewfinder 7 and the flash unit 8 and so exposes them. Furthermore, the projecting plate 10 mounted on the front of the camera body 1 projects out of the slot 22 of the protective cover 2 under the influence of the spring 15. Furthermore, since the switch 36 is turned on by the protuberance 27, power is supplied to the sequence control circuit 40, autofocussing device 41, shutter 42, and flash unit 43.

When depressed, the release member 9 contacts the fixed contact 38 to emit a release signal which is delivered to the sequence control circuit 40. The sequence control circuit 40 first actuates the autofocussing device 41 thereby to adjust the focus of the taking lens 4. Thereafter, the shutter 42 is actuated to start exposing the film. In synchronization with the actuation of the shutter 42, the electronic flash device 43 flashes. Upon completion of the exposure with the help of the shutter 39, the motor 44 starts rotating thereby to advance the film and to cock the shutter 42. After this, the sequence control circuit 40 charges the capacitor 34 by sending a charge start signal to the electronic flash device 43.

After finishing photographing, the protective cover 2 is slid to the left. In this case, by virtue of the action effected by the tunnel portion 24, the protective cover 2 is not impeded by the strap 30, and is moved smoothly to a closed position. While the protective cover 2 is maintained closed, as shown in FIG. 1, the taking lens 4, distance detector windows 5 and 6, viewfinder 7, flash unit 8, and release member 9 are covered by the protective cover, thereby protecting these parts so that they will not be scratched or protecting the release member 9 so that it not inadvertently be pushed down. In addition, while the protective cover 2 is closed, the power switch 36 turns off. Furthermore, since one edge of the slot 22 of the protective cover 2 cams the tapered surface 10a of the projecting plate 10, the projecting plate 10 retreats the psring 15 to be sheltered with the protective cover 2.

Figure 8:
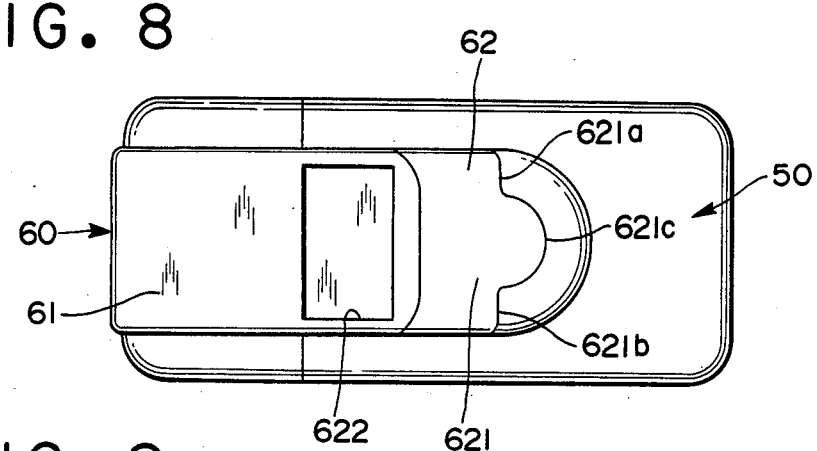
FIG. 8 is a front view showing another embodiment according to the present invention.
Figure 9:
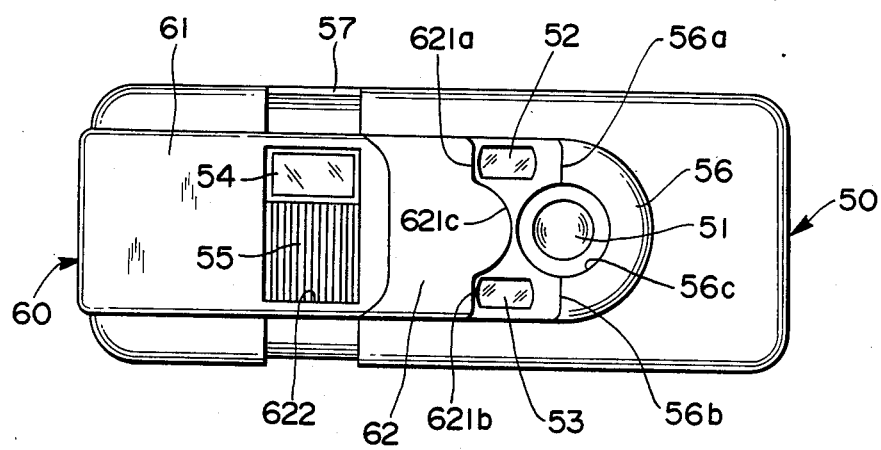
FIG. 9 is a front view showing the protective cover shown in FIG. 8 open.
Figure 10:
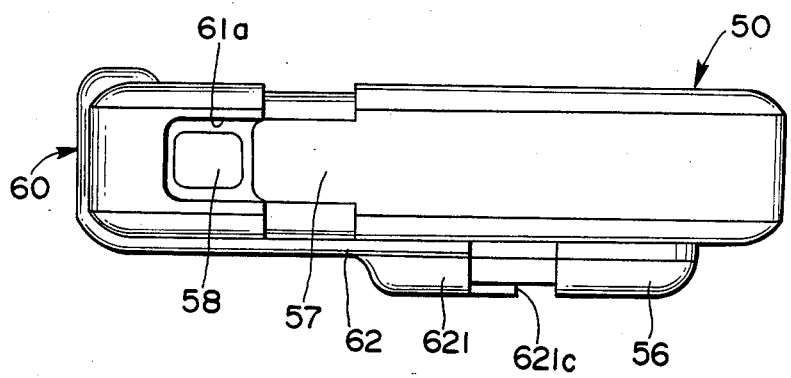
FIG. 10 is a plan view of FIG. 9 showing the protective cover open.

FIGS. 8 to 10 show an embodiment wherein a pair of rangefinder windows are disposed one above and one below the taking lens, and somewhat between the taking lens and the flash unit. In general, since a lens shifting mechanism and the shutter are located adjacent the taking lens, it is advantageous in assembling the camera to space the rangefinder windows apart from the taking lens. However, with that arrangement, the pulling out stroke of the protective cover would be too long. As a result, there arises the problem that the camera as a whole has too long a lateral dimension in use. This problem can be solved by providing a special configuration of the end face of the protective cover.

In FIG. 8, at the right side of the camera body 50, a protective cover 60 is slidably mounted on the camera body 50. The protective cover 60 is constructed of a main section 61 of box shape and a sheltering section 62 generally of plate shape projecting forward of the front face of the camera body 50. The sheltering section 62 is formed with a forwardly expanded portion 621 and an opening 622 of a rectangular shape. The expanded portion 621 has an edge with two linear portions 621a and 621b at opposite ends thereof and an arcuate portion 621c of a semicircular shape between the linear portions.

In FIG. 9, on the front face of the camera body 50, there are mounted a taking lens 51 and rangefinder windows 52 and 53 respectively above and below and somewhat to the right of the taking lens 51. At the right of the rangefinder windows 52 and 53, a viewfinder 54 and a flash unit 55 are mounted above and below each other. A hood 56 is formed integrally with the camera body 50 in such a way to borner the left half of the periphery of the taking lens 51. The edge of the hood 56 is formed with two linear portions 56a and 56b and a concave arcuate portion 56c, so as to mate with the end edge of the protective cover 60.

In FIG. 10, a plate 57 of rectangular shape is mounted on the top face of the camera body 50. The plate 57 is located within a concave portion 61a of cover 60 when the protective cover 60 is closed. The concave portion 61a is provided with a shutter release button 58.

As shown in FIG. 9, when the protective cover 60 is pulled out and moved to an open position, the taking lens 51 and the rangefinder windows 52 and 53 which had been sheltered by the expanded portion 621 of the protective cover 60 are exposed. If the end edge configuration of the sheltering section 62 of the protective cover 60 were instead a stright line connecting the linear portions 621a and 621b and the arcuate portion 621c were omitted, and if the end edge configuration of the hood 56 were a straight line extending vertically and disposed at the left side of the taking lens 51, the protective cover 60 during its opening or closing operation would have to be moved additionally by the amount corresponding to the arcuate portion 621c, and the amount of movement of the protective cover 60 would be undesirably great. In addition, the lateral length of the camera during photographing would be greater.

In the actual construction shown in FIG. 9, in the open position of the parts, the opening 622 coincides with the viewfinder 54 and the electronic flash device 55 thereby to expose these parts. Furthermore, the release button 58 mounted on the top face of the camera body 50 is also exposed. After finishing photographing, when the protective cover 60 is slid to the left, the taking lens 51 and rangefinder windows 52 and 53 are sheltered by the expanded section 621, and the viewfinder 54 and flash unit 55 are sheltered by the main section 61, and the release button 58 moves below the plate 57.

In the above embodiment, a protective cover of a box shape has been used; however, it may also be possible to have a plate shape such as to cover the front and/or top face of the camera body. It is further to be understood by those skilled in the art that the foregoing description is of preferred embodiments of the disclosed device and that various changes and modifications may be made in the invention without departing from the spirit and scope thereof.

What is claimed is:

1. A camera having a camera body and a protective cover slidably mounted on the camera body, a taking lens on the front face of said camera body which is sheltered by said protective cover when said protective cover is closed and is exposed when said protective cover is open, and a flash unit disposed to one horizontal side of said taking lens on said front face of said camera body within the range of movement of said protective cover, there being an opening in said protective cover which is disposed between said flash unit and said taking lens when said protective cover is closed and which coincides with said flash unit to expose said unit when said protective cover is open.

2. A camera as claimed in claim 1, in which said protective cover is of box shape and substantially matches the shape of said camera body.

3. A camera as claimed in claim 1, and a viewfinder disposed above said flash unit when said camera body is disposed horizontally, said viewfinder and said flash unit body being exposed by said opening of said protective cover.

4. A camera with a protective cover according to claim 1, and rangefinder windows for an autofocussing device disposed below and above said taking lens, said rangefinder windows and said taking lens both being sheltered by said protective cover when said protective cover is closed.

5. A camera as claimed in claim 1, and a projecting plate disposed at the side of said flash unit opposite said taking lens, and means urging said plate to project forwardly of said camera body, said projecting plate given a tactile indication of the fact that a finger masks said flash unit when the finger extends over and feels said projecting plate, there being a slot in said protective cover sideways of said opening and spaced apart from said opening by a distance substantially equal to that between said flash unit and said projecting plate, said slot coinciding with said projecting plate thereby to permit said urging means to project said projecting plate through said slot when said protective cover is open.

6. A camera as claimed in claim 5, wherein said projecting plate has an inclined forward surface, said projection plate being cammed rearwardly by abutment with an edge of said slot when said protective cover is moved to closed position.

7. A camera as claimed in claim 1, in which electric components are housed within said protective cover.

8. A camera as claimed in claim 1, and a power switch which turns on when said protective cover is opened and which turns off when said protective cover is closed.

9. A camera as claimed in claim 1, said protective cover having a tunnel portion extending in the direction in which said protective cover slides on said camera body, and a carrying strap extending through said tunnel portion and secured to said camera body.

10. A camera as claimed in claim 9, in which said tunnel portion is of rectangular tubular shape so as to correspond with the configuration of said strap.

11. A camera as claimed in claim 1, and a click mechanism for restricting the position of said protective cover when said protective cover is open or closed.

12. A camera as claimed in claim 1, and shutter release means on the top face of said camera body, said shutter release means being sheltered by said protective cover when said protective cover is closed and being exposed when said protective cover is open.

13. A camera as claimed in claim 4, in which said rangefinder windows are spaced apart from each other by a vertical distance substantially equal to the diameter of said taking lens and are disposed between said taking lens and said flash unit.

14. A camera as claimed in claim 1, in which the end edge of that portion of said protective cover that is disposed in front of said taking lens is comprised of a protruding semicircular edge portion and straight vertical edge portions above and below said semicircular edge portion.

* * * * *